United States Patent
Pertzsch et al.

[11] Patent Number: 5,601,647
[45] Date of Patent: Feb. 11, 1997

[54] PRODUCTION OF A MAGNETIC RECORDING MEDIUM

[75] Inventors: Albert Pertzsch, München; Reinhard Kraetschmer, Landsberg; Michael Breitsameter, Munich; Siegfried Rieger, Groebenzell, all of Germany

[73] Assignee: BASF Magnetics GmbH, Mannheim, Germany

[21] Appl. No.: 379,528

[22] PCT Filed: Jul. 29, 1993

[86] PCT No.: PCT/EP93/02017

§ 371 Date: Feb. 1, 1995

§ 102(e) Date: Feb. 1, 1995

[87] PCT Pub. No.: WO94/03890

PCT Pub. Date: Feb. 17, 1994

[30] Foreign Application Priority Data

Aug. 7, 1992 [DE] Germany ............ 42 26 139.2
Aug. 7, 1992 [DE] Germany ............ 42 26 138.4

[51] Int. Cl.$^6$ .................................................. B05D 3/12
[52] U.S. Cl. ............. 118/419; 427/131; 427/424.2; 427/548; 427/549; 427/550; 427/599
[58] Field of Search ................... 427/131, 434.2, 427/548, 549, 550, 599; 118/419

[56] References Cited

U.S. PATENT DOCUMENTS 3,681,138  8/1972  Ankenbrand et al. ............. 117/238
5,072,688  12/1991  Chino et al. ..................... 118/411
5,186,754  2/1993  Umemura et al. .................. 118/411

FOREIGN PATENT DOCUMENTS 392810  10/1990  European Pat. Off. .
1562601  3/1980  United Kingdom .

Primary Examiner—Bernard Pianalto
Attorney, Agent, or Firm—Keil & Weinkauf

[57] ABSTRACT

An improved extrusion coater having at least two coater slots for applying one or more magnetizable layers to a flexible nonmagnetic substrate is described. The upper lip of the outlet orifice is recessed relative to the lower lip and, in addition, the edge of a right parallelepiped magnet which has a gradient of more than 400 A/cm$^2$ in the direction of the extruder slot, resulting in a stabilized liquid cushion, is arranged opposite the outlet orifice for the dispersions from the extrusion coater, on the other side of the substrate. It is thus possible to apply very thin layers and to make the meniscus insensitive to interfering forces. To reduce the edge bead, a stripping plate (13) which is extended beyond the range of the upper or lower lip of the extrusion coater, in the direction of the coated material web (1), is mounted at both coating edges, a minimum distance of from 0.05 to 0.8 mm between the surface (19) of the stripping plate (13) and the coated material web being established (FIG. 1).

8 Claims, 2 Drawing Sheets

PRODUCTION OF A MAGNETIC RECORDING MEDIUM

The present invention relates to a process for applying one or more magnetizable layers one on top of the other to a flexible nonmagnetic substrate by means of an extrusion coater having at least two coater slots.

There are several methods for the application of such magnetizable layers. A dispersion containing the magnetic pigments can be applied to the film by immersion methods, knife coaters, reverse roll coaters or extrusion coaters. The extrusion coater has the advantage of a closed recycle-free system which meets the relevant cleanliness requirements for the production of a modern high-performance magnetic tape.

Extrusion coaters for the simultaneous application of two layers one on top of the other have been described in EP 0 392 810, DE 40 11 279 and U.S. Pat. No. 5,072,688. Here, two different dispersions flow one on top of the other inside the coating block and emerge from the extruder orifice as a double layer without mixing, directly onto the substrate moving freely past the extruder orifice. The layer fills the void between substrate and coater orifice. The constancy of the wet layer thickness over the web width and length is controlled by the uniformity of the metered amount and the running of the substrate. Owing to the system-related fluctuations in these properties, deviations of up to several μm in the wet layer thickness may occur, which is far too high in the case of wet layer thicknesses of about 10 μm, as required for modern magnetic tapes.

Furthermore, DE 19 07 212 describes an extrusion coating process which avoids the effect of the fluctuating film contact pressure by passing the substrate about 1 mm away from the extruder orifice, over the pole of a magnet. The magnetic dispersion emerging from the extruder orifice is drawn to the substrate by the action of the magnetic edge located directly behind the film web. In this case, the uniformity of thickness over the width still depends on the constancy of the metered amount, which constancy is associated with fluctuations. When precision metering pumps are used, the problem is reduced to the constancy of the amount delivered over the web width. In the apparatus described, moreover, only a single layer can be cast.

In addition, in the production of magnetic recording media, the object is to extend the coating of the magnetic dispersions uniformly over the width of the substrate, in order to avoid thickening of the layer at the edges of the films, due to the cohesive forces of the dispersions. This may be effected, for example, by providing stripping brushes at the coating edges; according to DE 29 36 035, another solution comprises arranging magnetic circles, which are adjusted to an angle of from 0.5° to 10° between coated edge and centre line of the slot, at the coated edges immediately after application of the magnetic dispersion to the substrate. These apparatuses require a significant technical complexity and must furthermore be continuously serviced in order to maintain and to monitor the constancy of the edge coat.

FR 2 321 742 describes a process for the production of multilayer magnetic recording media, slot dies being mounted, between coating means which are a distance apart, for extracting the solvent contained in the magnetic dispersion or for blowing in air to avoid undercoating with solvent.

It is an object of the present invention to provide a process which is capable, particularly at high coating speeds, of applying one or more layers simultaneously, at least one of which contains a layer of magnetic pigments and of ensuring the constancy of the wet layer thickness over the total coating width of ≦0.5 μm, relatively regardless of effects of the metered amount and the rheology.

It is a further object of the present invention to provide a process of the abovementioned generic type, in which no layer thickening or at most minimum layer thickening occurs at the cast edges, without additional measures in connection with the coated web.

We have found that these objects are achieved, according to the invention, by a process for applying one or more magnetizable layers one on top of the other to a flexible nonmagnetic substrate by means of an extrusion coater having at least two coater slots, wherein the upper edge of the upper outlet orifice arranged in the transport direction of the substrate is recessed with respect to the lower edge of the lower outlet orifice, a right parallelepiped magnet whose upper edge is opposite the common outlet orifice of the coater slots at a distance of from 0.1 to 5 mm away therefrom is arranged behind the substrate and parallel thereto, a stripping plate which extends essentially perpendicular to the outlet orifice is mounted at both coating edges, the outflowing coating dispersion runs off along the inner surface of the stripping plate, and the stripping plate is extended by an amount beyond the lower or upper extruder edge in the direction of the material web.

Further details of the invention are evident from the drawings, the description and the subclaims.

BRIEF DESCRIPTION OF THE DRAWINGS

The invention is illustrated in detail below with reference to the drawings in which.

Figure 1:
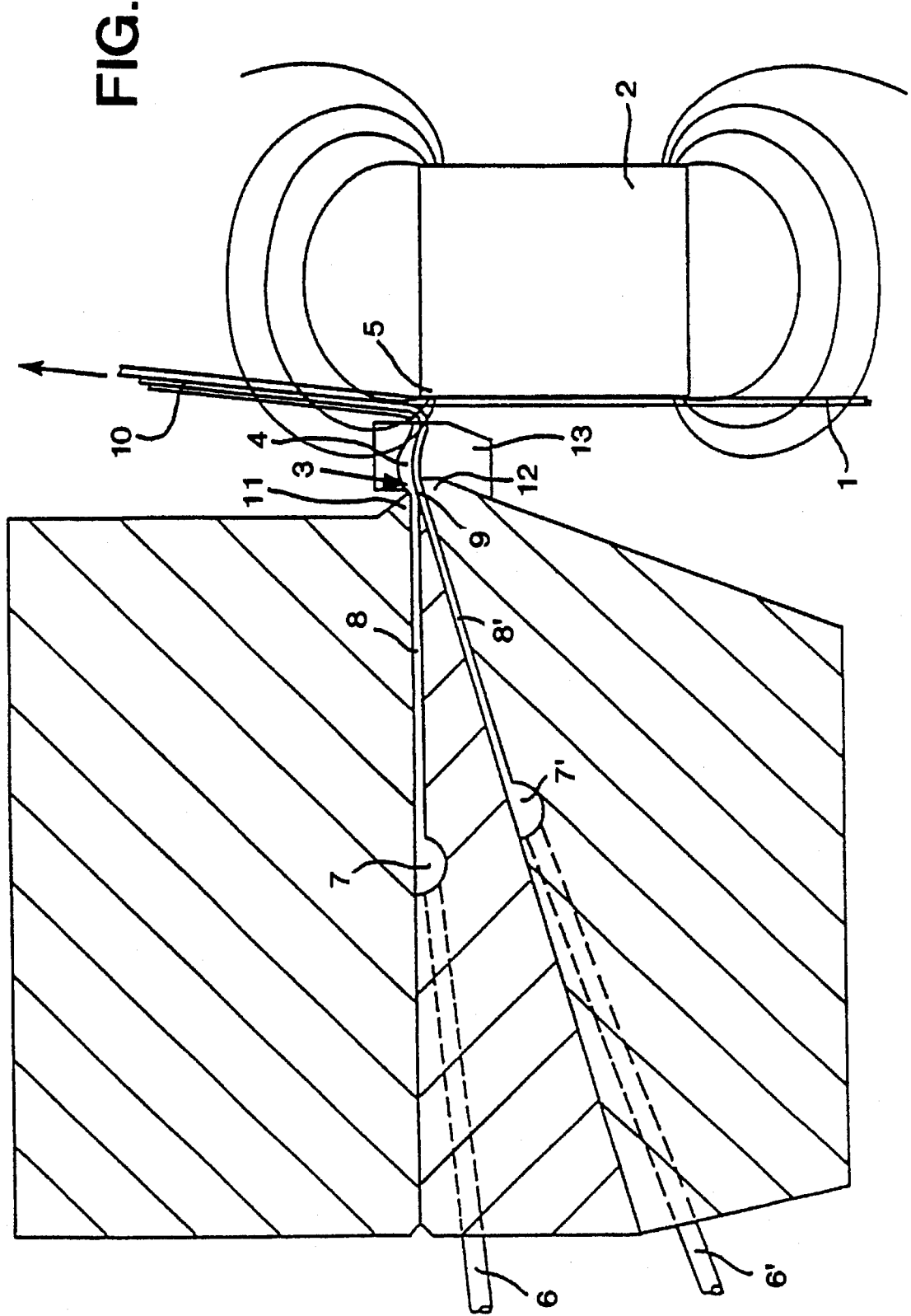
FIG. 1 shows a double-slot extrusion coater

The invention will now be described in detail with reference first of all to FIG. 1, using a double-slot extrusion coater as an example.

The substrate 1 to be coated is guided so that its back slides over the pole area of a magnet 2. The coater orifice 3 of the extrusion coater is opposite the upper edge 5 of the magnet and its slot points roughly at right angles toward the substrate 1.

By means of precision metering pumps (not shown), the coating dispersions are transported into the coater channels 6, 6', the number of which depends on the maximum number of layers to be applied one on top of the other. The dispersions flow into the distribution chambers 7, 7' in which the dispersions are distributed over the web width, which may be 500–1,000 mm, depending on the coating unit. These chambers additionally provide a certain buffer volume of about 5–100 ml each in order to compensate for pressure fluctuations in the downstream coater slots 8, 8'. The coater slots of the various dispersions unite shortly before the coater orifice 3. At the unification point 9, the dispersions flow one on top of the other in the desired sequence of layers without mixing at the interfaces. The ratio of the wet layer thicknesses of the individual layers is regulated by the particular metering speed. The coater orifice 3 has a width of 0.2–0.8 mm at the end of the slot.

According to the invention, the upper lip 11 of the outlet orifice 3 of the extruder is recessed relative to the lower lip 12. It has in fact been found that this increases the coating stability. The horizontal distance of the upper lip from the lower lip is from 0.5 to 1.5 mm. The single or multiple layer 10 emerging there is exposed to the influence of the magnetic field of the magnetic edge 5. The magnet 2 itself, a permanent magnet or electromagnet, has a rectangular shape and its flat pole surfaces are bounded by straight edges. The substrate 1 to be coated slides over one pole surface of the magnet, and the extruder orifice 3 is opposite the upper edge 5 of the pole surface. Since the magnetic edge 5 is located behind the substrate 1, high forces can be exerted on the magnetic dispersion without the magnet interfering with the coating process. The field is greatest at the edge 5, a field gradient of more than 400 A/cm$^2$ being present. This gradient is directed toward the extruder slot and has a force component opposite to the running direction of the substrate. This results in the formation of a liquid cushion 4 and the stabilization thereof. It is only as a result of this that it is possible to apply very thin layers and to make the meniscus insensitive to interfering forces, which can arise, for example, from electrostatic charging of the substrate. As is furthermore evident from the field lines in the figure, the substrate is guided so that the magnetic dispersion 10 is located in a longitudinal magnetic field when running off the magnetic edge. The longitudinal field has a strength of from 80 to 400 A/cm and effects an extremely desirable preliminary orientation of the magnetic particles. To reduce the edge constriction of the coating, in a preferred embodiment stripping plates 13 which considerably reduce the distance of the freeflowing dispersions from the substrate and are described in more detail below can be arranged at both coating edges.

The distance of the extruder orifice 3 from the substrate web 1 is 0.1–5 mm, preferably 1–1.5 mm. The dispersion layers 10 emerging from the extruder orifice 3 have a total thickness of about 500 μm at the time of emergence and can be stretched by the application process by a factor of up to 50, ie. down to a wet layer thickness of 10 μm on the substrate, depending on the metering and film speed, which is 100–500 m/min. The multiple layer character is thus retained without mixing at the interfaces, together with the predetermined relative individual layer thicknesses. Temporary thicker parts, such as adhesively bonded film areas in continuous operation, can be handled without problems using this apparatus. The constancy of the layer thickness over the length and width is completely independent of fluctuations in the quality of the substrate, such as thickness or contact pressure.

Inhomogeneities on the part of the extrusion coater (metered amount varying over the web width owing to pressure and speed differences) can be corrected by a number of adjusting screws (not shown) which are mounted at distances of about 50–100 mm. The adjusting screws are mounted along the coater width a few centimeters away from the extruder orifice. By means of a differential thread, the sizes of the coater orifice can be varied, for example, in the region of 50 μm independently of one another in the particular section. In this case, the coater lips 11, 12 bordering the extruder orifice have a corresponding flexibility, preferably as a result of material dilution points, so that the fluctuations in the wet layer thickness can thus be reduced. An adjusting apparatus of this type is described in German Laid-Open Application DOS 3,927,680.

The extrusion coating apparatus may consist of nonmagnetic steel, nonferrous metals, for example, bronze, brass or titanium, or corresponding metals or alloys, as well as solvent-resistant plastics or inorganic materials, such as ceramic or sintered materials. Excessive solvent losses (drying) in the region of the coater orifice, preferably in the edge region, can be avoided by suitable measures, for example by solvent moistening lips at the edges.

Figure 2:
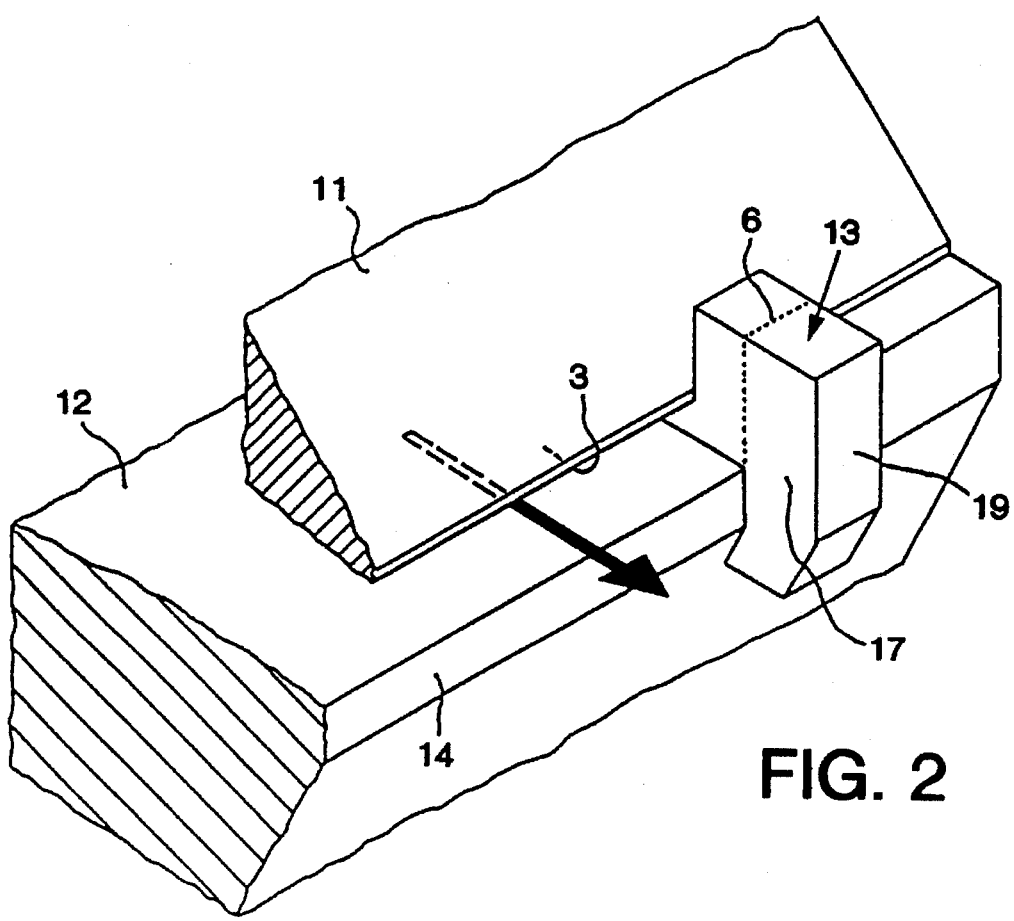
FIG. 2 shows a perspective view of a part of the extrusion coater with stripping plate
Figure 3:
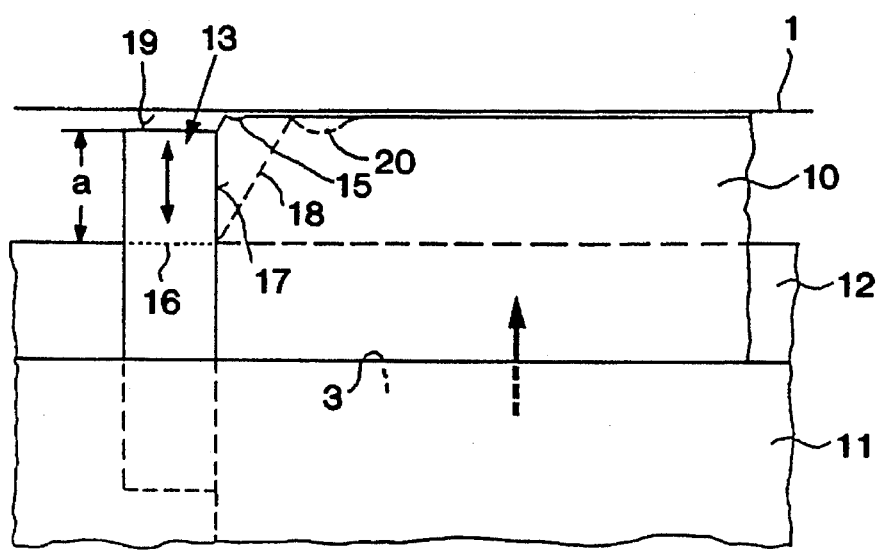
FIG. 3 shows a corresponding plan view of the coater with stripping plate, with running dispersion and material web.

As is evident from FIG. 2, it is also essential for the invention that a stripping plate 13 which is arranged essentially perpendicular to the extruder orifice 3 and parallel to the direction of the outflowing dispersion stream 10 is provided at both coating edges. The inner surface 17 of the stripping plate 13, along which the dispersion stream runs, may be chosen to be parallel to the edge of the material web or to be inclined outward by up to about 15°, so that the angle between extruder orifice 3 and inner surface 17 is from 90° to 105°. Starting from the retracted upper lip 11 already described, this stripping plate 13 extends over the run-off plane 12 of the projecting lower lip and continues in the direction of the material web 1, as is evident from FIG. 3. At both coating edges, the stripping plate 13 thus projects beyond the plane 14 of the extrusion coater by a certain amount (a) in the range of 0.3–1.3 mm.

If this were not the case and the stripping plate were flush with the plane 14 at the dotted line 16, owing to the cohesive forces already described the liquid meniscus 10 would extend inward starting from the coating edge, as indicated by the dashed line 18, and the result would be considerable coating bead 20, which would correspondingly reduce the effective coating width. However, since the stripping plate 13 is extended by the distance (a), the dispersion film can, as is likewise evident from FIG. 3, extend inward only by a small amount, and only a minimum coating bead 15 is formed. On the basis of extensive coating tests by the applicant, it was found that the distance of the outer surface 19 of the stripping plate 13, which surface is parallel to the material web 1, can be reduced to 0.05–0.8 mm from the coated material web 1. On passing a thicker part of the material web, for example an adhesive joint, either the entire coater, or, if required, the stripping plate 13 mounted on either side of the coating edges can be swivelled away in the direction indicated by the arrow and, after passing the thicker part, can be swivelled back again.

The stripping plate may consist of the same material as the remainder of the extrusion coater, i.e. of non-magnetic steel, bronze, brass, solvent-resistant plastics, ceramic or sintered materials. Furthermore, the stripping plates mounted on both sides may simultaneously contain solvent moistening lips to avoid drying at the coater orifice.

The total wet layer thickness can be adjusted down to 10 μm, which corresponds roughly to a dry layer thickness of 0.2 μm. The ratio of the part layer thicknesses can be freely adjusted. Suitable magnetic dispersions are all conventional ones, without taking into account the viscosity. Iron oxides, chromium dioxide, barium ferrite and/or metal powders can be used as magnetic pigments. The conventional binders and additives, such as dispersants, wetting agents, curing agents and solvents, can also be used.

The combination of magnetizable layers with nonmagnetic layers, such as adhesion-promoting layers, intermediate layers and antifriction layers, is also possible. The substrate used may be of any conventional type, for example polyethylene terephthalate or polyethylene naphthalate.

Use of the novel coating apparatus is to be illustrated below by a practical example, but without the invention being restricted thereto.

The arrangement of coater and magnet corresponds to FIG. 1. The material of the coater is nonmagnetic steel. The magnet is a permanent magnet in the form of a wall of individual barium ferrite blocks. The pole surfaces are each covered with a rectangular soft iron magnetic strip.

EXAMPLE 1

A 15 μm thick polyethylene terephthalate film serving as a substrate is coated with magnetic dispersions which have the composition shown in Tables 1 and 2 by means of a novel extruder under the production conditions indicated below and is then dried in order to produce a magnetic recording medium.

Production conditions:

Viscosity of a coating solution for the lower layer: 2,500 mPa.s (determined using a B-type viscometer after one-minute rotation at 360/min; also applicable below)

Viscosity of the coating solution for the upper layer: 4,000 mPa.s;

thickness of the dry layers: 2.7 μm for the upper layer, 3.3 μm for the lower layer; coating speed: 350 m/min.

TABLE 1

Lower layer

| Components | % by weight |
| --- | --- |
| Acicular $CrO_2$ ($H_c$ = 48 kA/m) | 3 |
| $\alpha$-$Fe_2O_3$ | 100 |
| Polyesterpolyurethane | 17 |
| Polyvinylformal | 3 |
| Zinc stearate | 1.5 |
| Triethanoldiamine dioleate | 1 |
| Tetrahydrofuran | 225 |

TABLE 2

Upper layer

| Components | % by weight |
| --- | --- |
| Acicular $CrO_2$ (37 kA/m) | 100 |
| $\alpha$-$Fe_2O_3$ | 3 |
| Polyesterpolyurethane | 15 |
| Polyvinylformal | 2.6 |
| Zinc stearate | 1.5 |
| Triethanoldiamine dioleate | 0.5 |
| Silicone oil | 0.1 |
| Tetrahydrofuran | 230 |

A coating completely free of stripes and wariness was obtained. The resulting magnetic recording medium had excellent magnetic and mechanical properties and had only a minimum edge bead.

We claim:

1. An apparatus for applying one or more magnetizable layers one on top of the other to a flexible nonmagnetic substrate comprising an extrusion coater having at least two coater slots, wherein an upper edge of an upper outlet orifice arranged in the transport direction of the substrate is recessed with respect to a lower edge of a lower outlet orifice, a right parallelepiped magnet whose upper edge is opposite a common outlet orifice of the coater slots at a distance of from 0.1 to 5 mm away therefrom is arranged behind the substrate and parallel thereto, a stripping plate which extends essentially perpendicular to the common outlet orifice is mounted at both coating edges, the outflowing coating dispersion runs off along an inner surface of a stripping plate, and the stripping plate is extended by an amount (a) beyond the lower or upper extruder edge in the direction of the coated substrate (1).

2. An apparatus as defined in claim 1, wherein the coater orifice has a width of from 0.2 to 0.8 mm, and the horizontal distance of the upper edge from the lower edge is from 0.5 to 1.5 mm.

3. An apparatus as defined in claim 1, wherein the stretching ratio of the dispersions applied from the coater slots onto the substrate is up to 1:50.

4. An apparatus as defined in claim 1, wherein the size of the field gradient of the edge of the magnet, which gradient is directed toward the coater orifice, is more than 400 A/$cm^2$.

5. An apparatus as defined claim 1, wherein the field strength of the magnet in the running direction of the coated substrate is from 80 to 400 A/cm.

6. An apparatus as defined in claim 1, wherein the angle between coater orifice and inner surface of the stripping plate (13) is from 90° to 105°.

7. An apparatus as defined in claim 1, wherein the distance between the surface of the stripping plate, which faces the material web (1) and is parallel to the coater orifice, and the coated material web is from 0.05 to 0.8 mm.

8. An apparatus as defined in claim 1, wherein the distance between the run-off surface of the projecting lower lip of the extrusion coater and the coated material web is from 1 to 1.5 mm.

* * * * *